(12) United States Patent
Tsuzuki

(10) Patent No.: US 6,226,471 B1
(45) Date of Patent: May 1, 2001

(54) IMAGE FORMING APPARATUS

(75) Inventor: Seiji Tsuzuki, Kawaguchi (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 09/537,513

(22) Filed: Mar. 29, 2000

(51) Int. Cl.$^7$ .................................................. G03G 15/00
(52) U.S. Cl. .................................................. 399/75; 399/43
(58) Field of Search ................................ 399/75, 43, 397, 399/407

(56) References Cited

U.S. PATENT DOCUMENTS 6,099,181 * 8/2000 Kitabatake ........................... 400/710

* cited by examiner

Primary Examiner—Richard Moses
(74) Attorney, Agent, or Firm—Foley & Lardner

(57) ABSTRACT

The main body of a digital copying machine is connected to a finisher. The main body subtracts a certain length of time from the sheet processing time designated by the finisher. Owing to this, even when the finisher is used, printing processing is executed with no need to decrease the processing speed originally provided for the main body of the digital copying machine.

12 Claims, 5 Drawing Sheets

IMAGE FORMING APPARATUS

BACKGROUND OF THE INVENTION

The present invention relates to an image forming apparatus, such as a complex-type digital copying machine that can be provided with option units, an example of which is a sheet discharging device (a finisher).

There is a conventional digital copying machine (an image forming apparatus) that can be provided with option units, an example of which is a sheet discharging device (a finisher). In this type of digital copying machine, the operation of the main body of the digital copying machine is controlled in accordance with the processing speed of the finisher.

The finisher has a function of stapling sheets that have been discharged from the main body of the digital copying machine, and a function of bundling sheets in a designated mode, such as a "sorting/grouping." In addition, the finisher has a function of determining the time required for the sheets from the image forming apparatus to be aligned or stapled. Specifically, in accordance with the types of sheets, the finisher outputs a signal indicating the time interval between the time when the last sheet is discharged and the time when the subsequent sheet is discharged (the time interval will be hereinafter referred to as a sheet processing time), and transmits that signal to the main body of the digital copying machine.

In accordance with the sheet processing time of the signal transmitted from the finisher, the main body of the digital copying machine controls the time intervals at which the sheets are fed. In other words, the main body of the digital copying machine controls the subsequent printing operations in accordance with the sheet processing time.

The main body of the digital copying machine can be provided with an enhanced processing speed, thus enabling a high-speed PPM (Print/Minutes). In actuality, however, the processing speed of the main body is restricted by the sheet processing time of the finisher. For this reason, the digital copying machine provided with the finisher cannot operate at its original high speed, resulting in a low processing speed. Moreover, if the finisher is set in the processing mode in which the sheets are stapled or sorted, the PPM of the main body may be greatly lowered.

If the main body is driven at high speed, with the finisher coupled thereto, the finisher is also required to attain high-speed processing. Suppose there are a high-speed main body and a low-speed main body. In this case, different types of finishers have to be prepared in accordance with the processing speeds of the main bodies. Alternatively, a finisher suitable for use with the high-speed main body has to be coupled to the low-speed main body. Although the high-speed finisher can be coupled to the low-speed main body, this is a waste of cost in many points, particularly in terms of the cost needed for the manufacture and development of the finisher.

BRIEF SUMMARY OF THE INVENTION

As described above, the operating speed of the main body of the image forming apparatus may be lowered due to the operating speed of a peripheral device coupled to the main body, and a peripheral device that is suitable for use with the high-speed main body of the image forming apparatus cannot be developed or manufactured without incurring many disadvantages, such as high cost. The present invention has been made in an effort to solve these problems, and the object thereof is to provide an image forming apparatus in which the operating speed of the main body is prevented from being lowered due to the operating speed of a peripheral device coupled to the main body, and which enables a peripheral device to be developed and manufactured at low cost without incurring disadvantages.

An image forming apparatus according to the present invention is of a type that comprises image forming means for forming an image on an image formation medium, and discharge means for discharging the image formation medium on which the image is formed by the image forming means, the image forming apparatus further comprising: adjustment means for adjusting a processing time designated by the discharge means and indicating a time interval that is left before image formation processing is executed next; and control means for controlling the image forming means to execute the image formation processing on the basis of the processing time adjusted by the adjusting means.

An image forming method according to the present invention is used in an image forming apparatus that comprises image forming means for forming an image on an image formation medium, and discharge means for discharging the image formation medium on which the image is formed by the image forming means, the image forming method comprising: adjusting a processing time designated by the discharge means and indicating a time interval that is left before image formation processing is executed next; and controlling the image forming means to execute the image formation processing on the basis of the adjusted processing time.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to the accompanying drawings.

Figure 1:
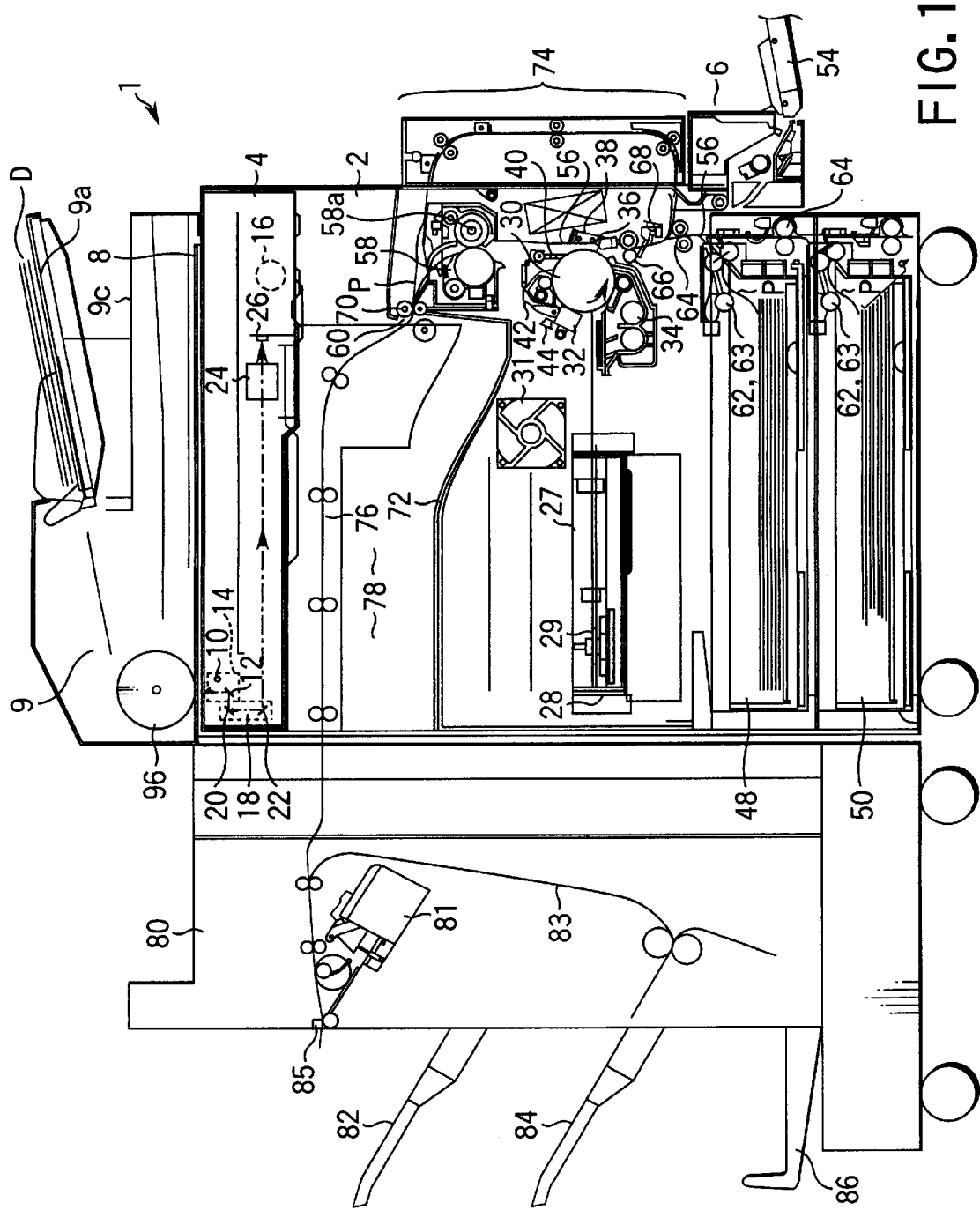
FIG. 1 is a sectional view showing the internal structure of a digital copying machine, which embodies an image forming apparatus according to the present invention.
Figure 2:
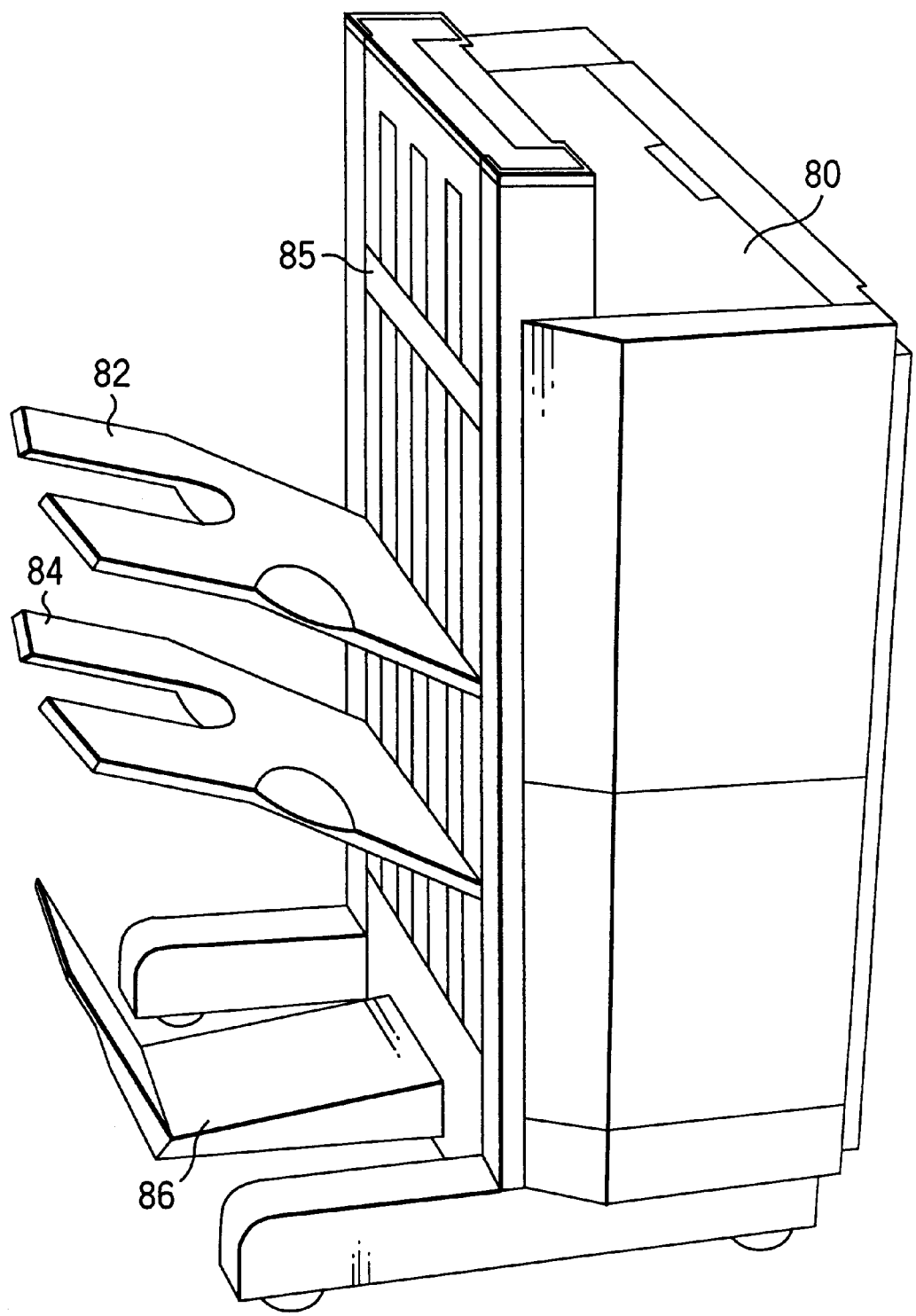
FIG. 2 is a view showing an external appearance of a finisher.

FIG. 1 is a sectional view showing the internal structure of a digital copying machine, which is an example of an image forming apparatus of the present invention. FIG. 2 is a view showing an external appearance of a finisher 80.

As shown in FIG. 1, the digital copying machine 1 is provided with a main body 2. A scanner section 4 serving as a reading means and a printer section 6 serving as an image forming means are arranged inside the main body 2.

A document table 8, on which an object to be read (i.e., a document D) is placed and which is made of a transparent glass plate, is provided for the upper surface of the main body 2. An automatic document feeder (hereinafter referred to as an ADF) 9 is arranged on the upper surface of the main body 2, so as to automatically feed documents D to the document table 8.

The document D placed on the document tray 9a of the ADF 9 are conveyed by a conveyance guide (not shown) and then discharged onto a discharge tray 9c by a platen roller 9b. When the documents D are being conveyed by the platen roller 9b, an image is read from them by executing an exposure scan by an exposure lamp 10 provided for the scanner section 4 (which will be described later).

The documents D are placed on the document tray 9a of the ADF 9, with the sides to be read being turned upward. They are sequentially fed one by one, beginning with the uppermost one.

The scanner section 4 arranged in the main body 2 is provided with: the exposure lamp 10 which serves as a light source for illuminating either a document D conveyed by the ADF 9 or a document D placed on the document table 8, and which is made of a halogen lamp, for example; and a first mirror 12 which deflects the reflected light from the document D in a predetermined direction. The exposure lamp 10 and the first mirror 12 are mounted on a first carriage 14 located under the document table 8.

The first carriage 14 is movable in parallel to the document table 8. It is moved back and forth in the region under the document table 8 by means of a toothed belt driven by a scanner motor (a driving motor) 16. The scanner motor 16 is a stepping motor, for example.

A second carriage 18 movable in parallel to the document table 8 is arranged under the document table 8. A second mirror 20 and a third mirror 22, which are for sequentially deflecting the light reflected by the document D and deflected thereto by the first mirror 12, are attached to the second carriage 18 in such a manner that they are orthogonal to each other. The torque of the scanner motor 16 is transmitted to the second carriage 18 through the toothed belt with which the first carriage 14 is driven or through some other suitable means. The second carriage 18 is moved in such a manner as to follow the first carriage 14, and is moved in parallel to the document table 8 at a speed half that of the first carriage 14.

An image-forming lens 24, which focuses the reflected light from the third mirror 20 on the second carriage 18, and a CCD sensor (a line sensor) 26, which receives the reflected light focused by the image-forming lens 24 and photoelectrically converts it, are arranged under the document table 8. The image-forming lens 24 can be moved by a driving mechanism in a plan that includes the optical axis of the light deflected by the third mirror 22. Due to the movement of the image-forming lens 24, the reflected light is focused at a desirable optical power (in the main scan direction). In accordance with image processing clocks supplied from a system CPU (to be described later), the CCD sensor 26 photoelectrically converts the reflected light incident thereon, and then outputs electric signals corresponding to the read document D. The power in the sub-scan direction can be varied by changing the feeding speed of the ADF 9 or the moving speed of the first carriage 14.

When the document D fed by the ADF 9 is read, the position to which light is radiated from the exposure lamp 10 is the fixed position shown in FIG. 1. When the document D placed on the document table 8 is read, the position to which light is radiated from the exposure lamp 10 is moved from left to right along the document table 8.

The printer section 6 is provided with a laser exposure device 27, which functions as a latent image forming means. The laser exposure device 27 is made up of a semiconductor laser 28, and a polygonal mirror 29 for guiding a laser beam from the semiconductor laser 28 to a photosensitive drum 30. The laser beam emitted from the laser exposure device 27 is scanned over the circumferential surface of the photosensitive drum 30, thereby forming an electrostatic latent image on the circumferential surface of the photosensitive drum 30.

The printer section 6 is provided with the rotatable photosensitive drum 30, and this drum serves as an image-bearing member located in the substantially central right region inside the main body 2. The circumferential surface of the photosensitive drum 30 is exposed to a laser beam emitted from the laser exposure device 28, thereby forming a desired electrostatic latent image. Arranged around the circumferential surface of the photosensitive drum 30 are: an electric charger 32 for electrically charging the drum circumference to have a predetermined charging characteristic; a developing unit 34 which serves as a developing means and develops the electrostatic latent image formed on the circumference of the photosensitive drum 30 at a desirable image density by supplying toner, i.e., a developing agent, to that image; and a separation charger 36 for separating image formation mediums (copy sheets) fed from cassettes 48 and 50 (to be described later) from the photosensitive drum 30. These structural members constitute an integral one-body structure. Also arranged around the photosensitive drum 30 are: a transfer charger 38 for transferring a toner image formed on the photosensitive drum 30 onto a sheet P; a separation claw 40 for separating the copy sheet P from the circumference of the photosensitive drum 30; a cleaning device 42 for removing the residual toner from the circumference of the photosensitive drum 30; and an electrical discharge unit 44 for electrically discharging the circumference of the photosensitive drum 30. These structural members are arranged in the order mentioned. The photosensitive drum 30, a developing roller (not shown) arranged in the developing unit 34, etc. are rotated by a main motor 31.

In the lower region inside the main body 2, an upper cassette 48 and a lower cassette 50 are stacked one upon the other. Each of these cassettes can be drawn out from inside the main body 2. Copy sheets P different in size are stored in the respective cassettes 48 and 50. A manual insertion tray 54 is provided at one side of the upper cassette 48.

A sheet feed path 56 is defined inside the main body 2. The sheet feed path 56 extends from the cassettes 48 and 50 through a transfer section, which is located between the photosensitive drum 30 and the transfer charger 38. A fixing unit 58 is arranged at the terminating end of the sheet feed path 56. A discharge port 60 is formed in the upper portion of the fixing unit 58.

A feed roller 62 and a separation roller 63 are arranged in the neighborhood of each of the upper and lower cassettes 48 and 50. By these rollers, the sheets P are taken out from each of the cassettes 48 and 50 one by one. A large number of pairs of feed rollers 64 are provided along the sheet feed path 56 so that the copy sheets P taken out by the feed and separation rollers 62 and 63 can be fed along the sheet feed path 56.

The sheet feed path 56 is provided with a pair of register rollers 66 located upstream of the photosensitive drum 30. By means of the register rollers 66, a skew of the taken-out copy sheet P is corrected, and the front end of the toner image on the photosensitive drum 30 and the leading edge of the copy sheet P are controlled to agree with each other. Then, the copy sheet P is supplied to the transfer section at the same speed as the peripheral moving speed of the photosensitive drum 30. A pre-aligning sensor (a pre-registration switch) 68 for detecting the arrival of a copy sheet P is arranged immediately before the paired register rollers, i.e., on that side of the register rollers 64 which is closer to the feed rollers 64.

Copy sheets P, taken out one by one from the cassettes 48 and 50 by the feed rollers 62, are fed by the feed rollers 64 and supplied to the paired register rollers 66. After the leading edge of a copy sheet P is adjusted in position by the register rollers 66, it is fed to the transfer section.

In the transfer section, a developer image (i.e., a toner image) formed on the photosensitive drum 30 is transferred onto the sheet P by the transfer charger 38.

After the toner image is transferred, the copy sheet P is separated from the circumference of the photosensitive drum by the separation charger 36 and the separation claw 40. Then, it is conveyed to the fixing unit 58 by a conveyance belt (not shown), which constitutes part of the sheet feed path 58. By the fixing unit 58, the developer image is melted and fixed to the copy sheet P. Then, the copy sheet P is discharged from the discharge port 60 by a pair of discharge rollers 70, and is thus fed onto a discharge ray 72.

An automatic reversing device 74 is arranged on the right side of the sheet feed path 56. The automatic reversing device 74 receives a copy sheet P when this copy sheet P has passed the fixing unit 58, reverses the copy sheet P, and then returns it to the sheet feed path 56.

A sorting lever (not shown) is arranged in the discharge port 60. By this lever, the copy sheet P discharged from the discharge port 60 is guided to either the discharge tray 72 inside the main body 2 or an externally transporting mechanism 76. The externally transporting mechanism 76 is arranged in the space 78 located above the discharge tray 72 inside the main device 2, and serves to convey the copy sheet P discharged from the discharge port 60 to a region outside of the main body 2.

A finisher 80, such as that shown in FIG. 2, is coupled to one side of the main body 2. The finisher 80 serves as a sheet discharging unit and receives copy sheets P (the lower surfaces of which are printed) fed by the externally transporting mechanism 76.

In the finisher 80, a set of documents (sheets P) supplied thereto are bundled, and the rear end portions of the documents are stapled together by a stapler 81. Plural sets of documents are stacked on tray 82, tray 84 or tray 86. Trays 82 and 84 are vertically movable, and descend in accordance with the weight of the stacked documents. Copy sheet P supplied to the finisher 80 are fed along a reversal sheet feed path 83, by which they are discharged onto the trays 83, 84 and 86, with their printed sides upward.

In the stapling-sorting mode, the finisher 80 sorts documents so that in units of one set, and the stapler 81 aligns and staples the documents of each set. Thereafter, the documents are stacked on the trays. In either the sorting mode or the grouping mode, the finisher 80 moves the trays each time the documents constituting one set are discharged from the main body 2 of the digital copying machine. In this manner, documents sorted in units of one document are stacked on each tray.

On the upper front portion of the main body 2, a control panel 90 (to be described later) is provided, for entering various copying conditions, such as a copy magnification, and designating the start of a copying operation.

The digital copying machine 1 may be used as a standalone machine or as a network printer.

When used as a network printer, the digital copying machine 1 is connected to external devices, such as personal computers (PC) or a server, by means of a local network (LAN).

A description will now be given of the control system of the digital copying machine 1.

Figure 3:
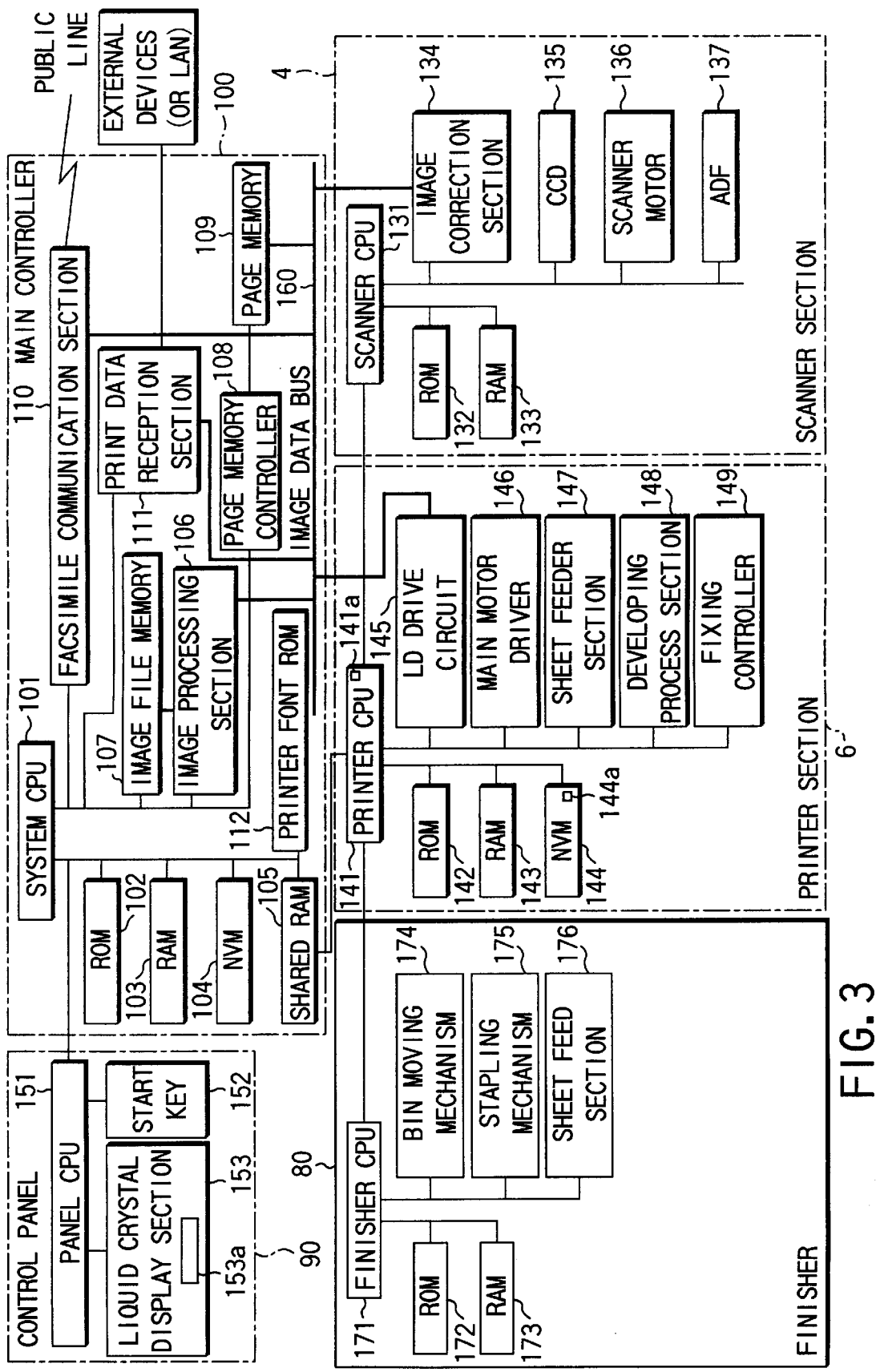
FIG. 3 is a block diagram showing the internal structure of the digital copying machine.

FIG. 3 is a block diagram schematically illustrating how the structural components of the digital copying machine 1 are connected together and how signals are exchanged for control.

As shown in FIG. 3, the main body of the digital copying machine 1 comprises a main controller 100, the scanner section 4, the printer section 6, and the control panel 90. The finisher 80, which is an option unit, is connected to the digital copying machine 1.

The main controller 100 includes a system CPU 101, a ROM 102, a RAM 103, an NVM 104, a shared RAM 105, an image processing section 106, an image file memory 107, a page memory controller 108, a page memory 109, a facsimile communication section 110, a print data reception section 111, a printer font ROM 112, etc.

The system CPU 101 controls the entirety of the main controller 100. The ROM 102 stores various control programs. The RAM 103 temporarily stores data. The NVM (a nonvolatile RAM) 104 is a nonvolatile memory backed up by a battery (not shown). The shared RAM 105 is used for the mutual communication between the system CPU 101 and the printer CPU 131.

The image processing section 106 is made of an image processing circuit, for example, and executes various kinds of image processing, such as trimming, masking, image compression, and image expansion. The image processing section 106 compresses image data read by the scanner section, thereby converting them into an image file. In this manner, the image processing section 106 converts image data into an image file.

The image file memory 107 is made of a hard disk drive, for example. It records the image data, which are processed as a file by the image processing section 106. The page memory controller 108 controls the page memory 109. This page memory 109 stores the image data read by the scanner section 4 and image data to be printed by the printer section 6.

The facsimile communication section 110 transmits facsimile data to a communication line, such as a public line, and receives them from the communication line. The facsimile communication section 110 converts received facsimile data into image data, and outputs the resultant image data to the page memory 109.

The print data reception section 111 receives print data from an external device (e.g., a personal computer), which is connected thereto through a printer cable or a local area network (LAN). The printer font ROM 112 stores font data corresponding to code data, such as a character code.

The print data reception section 111 develops the print data received from the external device, on the basis of the font data stored in the front ROM, thereby obtaining image data. The image data are output to the page memory 109. The print data described above includes code data, such as a character code, control data for controlling the character size, resolution, etc., or bit map data.

The scanner section 4 will be described. The scanner section 4 is made up of: a scanner CPU 131, a ROM 132, a RAM 133, an image correction section 134, a CCD sensor (CCD) 135, a scanner motor 136, an auto document feeder (ADF) 137, etc.

The scanner CPU 131 controls the entirety of the scanner section 130. The ROM 132 stores control programs etc. The image correction section 134 includes a line sensor, an A/D converter circuit, a shading correction circuit, a gamma correction circuit, etc. The image correction section 134 receives image signals sent from the CCD 135. The image correction section 134 executes A/D conversion and correction with respect to the image signals it receives, and outputs the resultant data to the page memory 109. The CCD 135 is driven under the control of a CCD driver (not shown). The scanner motor 136 is provided with an exposure lamp, a mirror, etc., and drives a unit (not shown) that exposes documents to light. The ADF 137 sequentially feeds a plurality of documents to the predetermined read position.

The printer section 6 will now be described. The printer section 6 is made up of: a printer CPU 141, a ROM 142, a RAM 143, an NVM (a nonvolatile RAM) 144, an LD drive circuit 145, a polygonal motor 146, a sheet feeder section 147, a developing process section 148, a fixing controller 149, etc.

The printer CPU 141 controls the entirety of the printer section 6. The printer CPU 141 has a timer 141a for measuring the a standby time. The ROM 142 stores control programs, etc. The NVM (NV-RAM) 144 stores various kinds of data used at the time of a copying operation, and also stores information sent from the finisher 80 or another option unit. The NVM 144 includes a storage area 144a for storing adjustment values, such as a sheet processing time. The LD drive circuit 145 controls the laser exposure device 27. The LD drive circuit 145 controls the light emission performed by the semiconductor laser 28, so as to form an electrostatic latent image on the photosensitive drum 30 (which serves as an image-bearing member). The LD drive circuit 145 controls the rotation of the polygonal mirror 29 so as to guide light from the semiconductor laser 28 to the photosensitive drum 30. A main motor driver 146 controls the rotation of the main motor 31.

The sheet feeder section 147 controls the operation of conveying sheets from each of the sheet feed stages (cassettes) 48, 50 and 54 to the finisher 80. On the basis of the operation commands from the printer CPU 141, the feed rollers 62, separation rollers 63, paired feed rollers 64, register rollers 66, paired discharge rollers 70, etc. are driven while being controlled. In this manner, the sheet feeder section 147 controls the feeding of sheets along the sheet feed path 56 and in the externally transporting mechanism 76. The developing process section 148 electrically charges the photosensitive drum 30, develops an image, and transfers the image to a sheet. The fixing controller 149 controls the fixing unit 58, which fixes an image transferred onto a sheet.

When printing processing is executed, the printer CPU 141 feeds a sheet from the sheet feed cassettes and temporarily stops it in front of the register rollers 66. The printer CPU 141 detects that the sheet has come to the position just in front of the register rollers 66, on the basis of a sensing signal sent from the pre-aligning sensor 68. When the conditions required for the execution of a printing operation are all satisfied, the printer CPU 141 drives the register rollers 66 and feeds sheets toward the rear of the printer, thus performing the printing operation.

The timings at which the printer CPU 141 drives the register rollers 66 correspond to the timings at which the printing operation is started. The printer CPU 141 feeds a sheet from a sheet feed cassette, and waits for the print start conditions (e.g., the preparation of an image) to be met. When the printing start conditions have been met, the printer CPU 141 starts the driving of the register rollers 66 and executes the printing process with respect to the sheet.

The sheet feed intervals, which are the intervals at which the printing processing is executed for sheets, correspond to the driving intervals of the register rollers. In the descriptions below, therefore, the intervals at which the register rollers are driven will be regarded as being the same as the sheet feed intervals.

The control panel 90 comprises a panel CPU 151, a start key 152, a liquid crystal display section 153, etc. The panel CPU 151 controls the entirety of the control panel 90. The start key 152 is operated when the copying operation or facsimile transmission is started. The liquid crystal display 153 is a liquid crystal panel incorporating a touch panel 153a.

An image data bus 160 is a line through which image data are transmitted and received. To this image data bus 160, the image processing section 106, the page memory 109, the facsimile communication section 110, the print data reception section 111, the image correction section 134, the LD drive circuit 145, etc. are connected.

A description will now be given of the finisher 80. The finisher 80 includes a finisher CPU 171, a ROM 172, a RAM 173, a bin moving mechanism 174, a stapling mechanism 175, a sheet feed section 176, etc.

The finisher CPU 171 performs mutual communication with reference to the printer CPU 141. When the printer section 6 executes an image forming operation, the finisher CPU 171 supplies the printer CPU 141 with signals regarding the operation of the finisher 80, such as a processing time. The bin moving mechanism 174 is a mechanism for moving the trays 82 and 84. The stapling mechanism 175 drives the stapler 81 before stapling processing is executed. The sheet feed section 176 controls the feeding of the finisher 80.

In accordance with an operating mode, such as stapling-sorting mode, the sorting mode or the grouping mode, the finisher CPU 171 outputs a signal indicating a sheet processing time, based on which the feed timings of sheets are designated, and supplies that signal to the printer CPU 141.

The sheet processing time is a time interval that enables the finisher 80 to process a sheet subsequently fed to the digital copying machine 2. When the stapling mode is selected, the sheet processing time is determined on the basis of the time required for the stapling processing. When either the sorting mode or the grouping mode is selected, the sheet processing time is determined on the basis of the time required for the sorting processing of sheets, such as the time required for a sheet aligning operation.

A description will now be given as to how the main body 2 of the digital copying machine provided with the finisher 80 operates and how the finisher operates.

When the finisher 80 is not provided, the sheet feed interval of the main body of the digital copying machine is determined in such a manner that the driving of the register motors 66 is started when all conditions enabling the start of a printing operation, such as the operation of preparing an image to be printed, are satisfied.

When the finisher 80 is provided, the driving of the register rollers 66 is started not only on the conditions required when the finisher 80 is not provided but also on the condition that the sheet processing time designated by the finisher 80 has elapsed.

If, as shown in FIG. 1, the finisher 80 is provided for the main body 2 of the copying machine, the printer CPU 141 of the main body 2 and the finisher CPU 171 of the finisher 171 are connected to each other by way of a serial I/F, as shown in FIG. 3. In this state, signals indicative of the sheet processing times are exchanged. More specifically, the finisher CPU 171 sends a signal indicative of a sheet processing time to the printer CPU 141, which receives that signal.

When the register motor 66 is driven, the printer CPU 141 requests that the finisher CPU 171 output a signal indicative of a sheet processing time. Upon receipt of the request for the sheet processing time, the finisher CPU 171 determines a sheet processing time and sends a signal indicative of this time to the printer CPU 141. Accordingly, the printer CPU 141 receives a signal showing the sheet processing time.

The printer CPU 141 starts measurement of the elapse of time at the time when the register rollers 66 are driven. When the register rollers 66 are driven next, it is checked if the predetermined length of time corresponding to the sheet processing time received from the finisher CPU 171 has elapsed.

If the check shows that the sheet processing time has not elapsed, the printer CPU 141 keeps a sheet in a standby state until the sheet processing time elapses. After the elapse of the sheet processing time, the printer CPU 141 drives the register motor 66, thus starting the printing operation.

In this manner, the main body of the digital copying machine executes a printing operation in accordance with the operating time of the finisher 80. As long as this operation is performed, however, the operating time of the digital copying machine 2 is restricted by the sheet processing time notified by the finisher 80.

Next, a description will be given of the sheet processing time, which is designated by the finisher 80 as stated above.

The sheet processing time is calculated in accordance with the operating mode of the finisher 80 and is a sum of various kinds of time, including a sheet feed time required for a sheet to moved inside the finisher 80, a stacking time (i.e., the time required for sheets to become stationary), an aligning time (i.e., the time required for registering each sheet), a binding time (i.e., the time required for stapling), etc. These kinds of time each include a margin time that is determined in light of the operation speed difference between various driving motors, the operation difference between mechanical components, such as a clutch, or the behavior (e.g., slipping) of each sheet being fed.

The margin time of the main body 2 of the digital copying machine is based on various factors that are taken into consideration when the sheet feed intervals are determined. For example, the factors of the margin of the main body 2 of the digital copying machine include the following: a count processing time required from the time when the register rollers 66 are driven to the time when time measurement is actually started; a time gap between the time when a command for starting the driving of the register rollers is issued and the time when the register motor 66 is actually driven to start the feeding of sheets; the operating-speed differences between the motors of the main body; the feed-time difference which result from the behavior of each sheet being fed (e.g., slipping), etc. These various factors are taken into consideration when the margin of the print operation of the main body 2 of the digital copying machine is determined.

As can be seen from the above, the main body 2 of the digital copying machine is like a "black box" to the finisher 80, and the margin considered by the finisher 80 is related only to the operation thereof. Conversely, the finisher 80 is like a "black box" to the main body 2 of the digital copying machine. Hence, the margin considered by the main body 2 of the digital copying machine is related only to the operation thereof, and has nothing to do with the margin of the finisher 80.

The margins are determined in consideration of the worst case of each component. If a number of components are provided for one machine, there is substantially no probability that all components will require the margins determined for the worst. In other words, there is little probability that all components will operate on the basis of the margins determined for the worst.

In general, if a plurality of components are provided for one machine, as described above, the overall margin is not determined by merely adding the margins of the components together. That is, the margin of each component is decreased to a certain extent, and a margin that enables the whole of the machine to work reliably as a commercial product is determined as the overall margin.

However, in the case where components connected to the main body are black boxes, the overall margin is determined by simply adding the margins of the components and the margin of the main body together. Where the main body 2 of the digital copying machine is connected to the finisher 30, the margin of sequential operation is determined by simply adding the margin of operation of the main body 2 to that of the finisher 80.

Where the main body 2 of the digital copying machine and the finisher 80 are connected together and operated, there are an increased number of components that are designed in consideration of the operation margins of the main body 2 and the finisher 80. There is, accordingly, decreased probability that the margins of all components will be required.

If the total margin required is a sum of the maximal value of the margin of the main body 2 of the digital copying machine and the maximal value of the margin of the finisher 80, it is very likely that the combination between the main body 2 and the finisher 80 will be regarded as a product not suitable for practical use.

In view of the foregoing, the present invention is designed in such a manner as to provide an optimal margin when the finisher 80 is used. Owing to such a margin, the PPM of the main body 2 of the digital copying machine is improved when the finisher 80 is coupled.

To be more specific, the sheet processing time, which is sent from the finisher 80 as a signal, is adjusted by the main body 2 of the digital copying machine. In other words, the main body 2 of the digital copying machine subtracts a certain length of time from the sheet processing time (which determines the sheet feed interval) on the basis of the margin of the printing operation to be executed. Hence, the main body 2 of the digital copying machine executes the printing operation at short sheet feed intervals, and feeds sheets in a period of time that is as short as possible and yet enables an operation of the finisher 80. As a result, the sheet processing time, which is received as a signal from the finisher 80, is processed as if it were short from the beginning, and the register rollers 66 are driven at intervals shorter than the sheet processing time.

Owing to the features described above, the main body 2 of the digital copying machine executes a printing operation at short intervals, and the PPM is improved, accordingly.

A description will now be given of the time subtracted from the sheet processing time.

By way of example, suppose that the sheet processing time of the finisher 80 has an overall margin of 300 mmsec, and that the sheet feed time of the main body 2 of the digital copying machine has an overall margin of 500 mmsec. If the margin of the sheet processing time and the margin of the sheet feed time are merely added together when the finisher 80 is coupled to the main body 2 of the digital copying machine, the machine as a whole has a total margin of 800 msec. When the entire machine is actually operated, a margin that is 80% of the above total margin is considered normal.

When the machine as a whole has a total margin of 800 msec, a sheet processing time of 150 msec can be subtracted. If a finisher 80 having a processing capacity of 70 PPM is coupled to a digital copying machine main body having a processing capacity of 80 PPM, and the sheet processing time as described above is not subtracted, then the processing speed of the entire machine is 70 PPM. If, however, the sheet processing time is subtracted, it is possible to attain a processing speed of 80 PPM.

A test was actually conducted, employing a main body whose operating condition was rather poor in terms of the sheet slip characteristic and the driving conditions of motors. Although the sheet processing time was shorted by 40% in the test, this did not result in any undesirable situation. In the above description of the embodiment, reference was made to the case where the sheet processing time of the entire machine was shorted by 20%. This subtraction rate was determined in consideration of the result of the test and the characteristic differences among machines.

A description will now be given of the timing when the sheet processing time is decreased.

The margins of motors or other devices used for driving the main body 2 of the digital copying machine or the finisher 80 are values that guarantee minimal level operations when the motors or other devices are driven singly. Therefore, when a plurality of such components are provided and driven based on the minimal level operation-guarantee values, the machine as a whole is not considered to operate properly.

However, the margins determined for the operations of mechanical devices, such as a clutch mechanism, are related to environmental operating conditions, such as temperature and moisture, the states of sheets to be discharged, characteristic differences among parts, etc. Even if the mechanical devices are driven based on the minimal level operation-guarantee values, the machine as a whole is not considered to be in the abnormal condition.

The operating speed differences among the mechanical devices are considered far greater than the operating speed differences which are due to the performances of the motor, etc. This is because the mechanical devices may not be assembled in exactly the same manner at the time of manufacture, resulting in differences in operation. If these are taken into consideration, it can be understood that the margins attributable to the mechanical devices should not be ignored. Inclusion of such margins is desirable so as to prevent undesirable or useless operations.

A lot of margins determined for the operations of mechanical devices are included in the operation for stapling sheets in the stapling mode and the operation for aligning them by means of an aligning bar (not shown) in the sorting-grouping mode. When these operations are performed, therefore, it is desirable to use the margin designated by the finisher 80, without the sheet processing time being shortened.

When a signal indicating a sheet processing time in which a lot of margins related to the operations of mechanical devices are included is received from the finisher 80, the main body 2 of the digital copying machine can use the received sheet processing time without shortening it. Operations that include a lot of margins related to the operations of mechanical devices are, for example, a stapling operation, a sheet aligning operation executed in the sorting mode or grouping mode, etc. At the start of each print job, sheets are shifted by moving the trays, and this sheet shifting operation includes a lot of margins related to the operations of mechanical devices.

The print job mentioned above is based on data which are determined for each print processing and which manage the printing operation modes, setting values or the number of copies to be made. This means that different kinds of print operation are executed in different print jobs. In the present embodiment, one print job is determined for making one set of documents in the stapling mode, the sorting mode or the grouping mode. Therefore, if three pieces of printed matter are prepared, there are three print jobs corresponding to the operations of printing the three pieces.

During the operation for printing a few sheets from the foremost one, sheets are shifted, and this sheet shifting operation includes a lot of margins related to the operations of mechanical devices. Therefore, the main body 2 of the digital copying machine does not shorten the sheet processing time when it is executing a printing operation for the first three sheets of the print job. In other words, the main body 2 executes the printing operation based on the sheet processing time sent from the finisher 80 as a signal, and no change is made to the sheet processing time. In the printing operation for the subsequent sheets, i.e., the sheets after the third sheet, the sheet processing time is shortened.

For example, in the printing operation for the print job, a certain length of time should not be indiscriminately subtracted from the sheet processing time. If this is done, a subsequent sheet may be discharged when a stapling operation is being performed. It is therefore very likely that an abnormal state such as sheet jamming will occur when the print operation is being performed for several sheets from the first one of the print job.

A description will be given of the length of time that is subtracted from the sheet processing time.

The length of time that is subtracted from the sheet processing time (i.e., the adjustment value for the sheet processing time) can be varied by operating the control panel 90. The adjustment value of the sheet processing time can be varied by a self-diagnostic function that is made available by operating the control panel 90. In the self-diagnostic function, the adjustment value of the sheet processing time can be entered by inputting a special code known to authorized operators alone.

Owing to this feature, only the authorized operators are allowed to determine the length of time which is to be subtracted from the sheet processing time. In other words, ordinary users are prevented from setting the length of time to be subtracted from the sheet processing time.

The adjustment value of the sheet processing time can be set by entering the length of time to be subtracted from the sheet processing time. It is possible to determine the adjustment value of the sheet processing time to be 0 mmsec. When the adjustment value of the sheet processing time is 0 mmsec, the main body 2 of the digital copying machine executes a printing operation without shortening the sheet processing time. Owing to the use of this adjustment item, the main body 2 of the digital copying machine and the finisher 80 are at least available even if all their components are operating based on their worst margin values.

The adjustment value of the sheet processing time can be determined by entering a length of time in the manner described above. Alternatively, it may be determined by entering a time ratio that defines the length of time to be subtracted from the sheet processing time.

Figure 4:
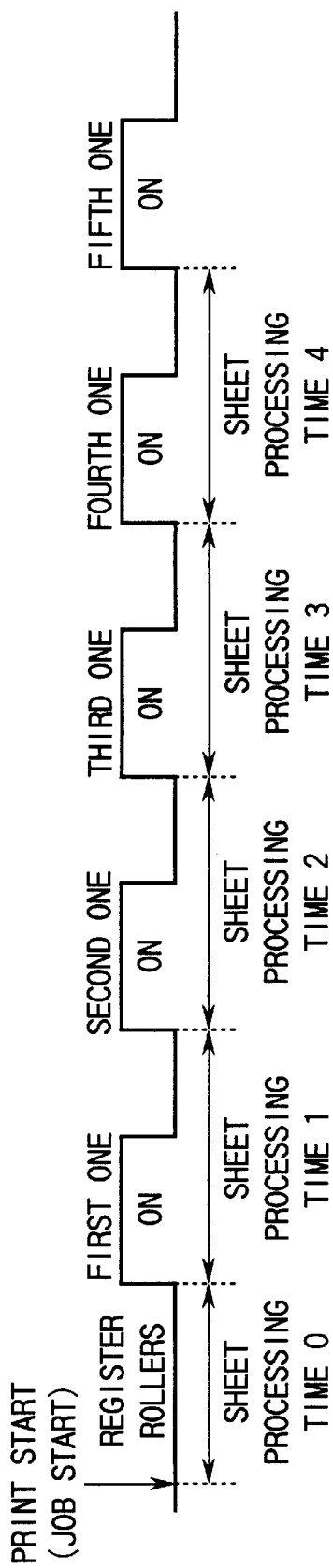
FIG. 4 is a timing chart showing the timings at which register rollers are driven.
Figure 5:
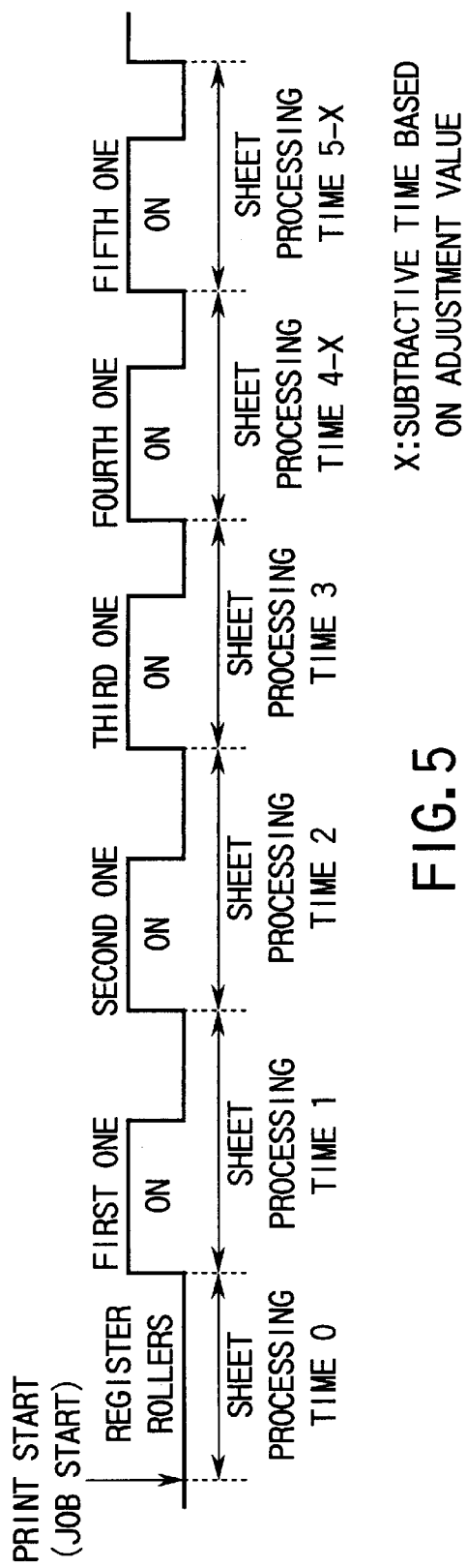
FIG. 5 is a timing chart showing the timings at which the register rollers are driven.

FIGS. 4 and 5 are timing charts illustrating the timings based on which the register rollers 66 are driven. FIG. 4 shows the timings based on which the register rollers 66 are driven in the case where the printing process is executed without the sheet processing time designated by the finisher being varied. FIG. 5 shows the timings based on which the register rollers 66 are driven in the case where the printing operation is executed for the first three sheets of the print job without the sheet processing time designated by the finisher being altered and is executed for the fourth and remaining sheets with the sheet processing time being varied.

A description will now be given with reference to the flowchart shown in FIG. 6 as to how the feeding of sheets is controlled during the printing process.

When a user makes a request for the printing of a copy, the printing of print data, or the printing of facsimile data, the system CPU 101 determines printer jobs and sends a print request to the printer CPU 141 for each of the printer jobs. Upon receipt of the printing request, the printer CPU 141 starts a printing operation and simultaneously starts controlling the feeding of sheets.

First of all, the printer CPU 141 takes one sheet out of a sheet feed cassette (designated by the print request which the system CPU 101 makes simultaneously with the start of sheet feeding) and feeds it along the sheet feed path 56 (Step S1). When the sheet fed along the sheet feed path 56 is sensed by the pre-aligning sensor 68 (Step S2), the printer CPU 141 stops feeding the sheet and makes it stand by immediately before the register rollers 66.

When the sheet has reached the register rollers 66, the printer CPU 141 determines whether or not an image to be printed on the sheet has been prepared (Step S3). If the image is determined to have been prepared, the printer CPU 141 determines whether or not the time corresponding to the sheet processing time has elapsed from the time when the register rollers 66 were driven last (Step S4).

A signal indicating the sheet processing time, which is sent from the finisher CPU 171, is received in synchronism with the start of the printing operation with respect to the first sheet, and is received in synchronism with the start of the driving of the register rollers 66 with respect to the second and subsequent sheets.

If it is determined that the sheet processing time has not yet elapsed, the printer CPU 141 is set in the standby state until the elapse of the sheet processing time. When it is determined that the sheet processing time has elapsed, the printer CPU 141 starts driving the register rollers 66 so as to resume the feeding of the sheet from the position immediately before the register rollers 66 (Step S5).

With the processing described above being executed, all conditions required for the start of printing, including the elapse of the sheet processing time, are satisfied. In response to this, the printer CPU 141 drives the register rollers 66 to feed the sheet to the image formation section, and executes the printing operation.

At the time, the printer CPU 141 acquires information on the sheet processing time (Step S6). To be more specific, the printer CPU 141 requests that the finisher CPU 171 provide a sheet processing time, and receives a signal indicating the sheet processing time which the finisher CPU 171 provides in response to the request. The printer 141 determines a sheet processing time on the basis of the signal it receives. In this manner, the printer CPU 141 acquires information on the sheet processing time, and starts to measure the sheet processing time by means of the timer 141a.

The printer CPU 141 also determines whether or not there is another sheet to be printed (Step S7). If this determination shows that there is another sheet to be printed, the printer CPU 141 returns to step S1 and repeats the processing described above. If the determination shows that there is no more sheet to be printed, the printer CPU 141 puts an end to the print processing.

The processing performed in Step S6 for acquiring information on the sheet processing time will now be described in detail.

Figures 6, 7:
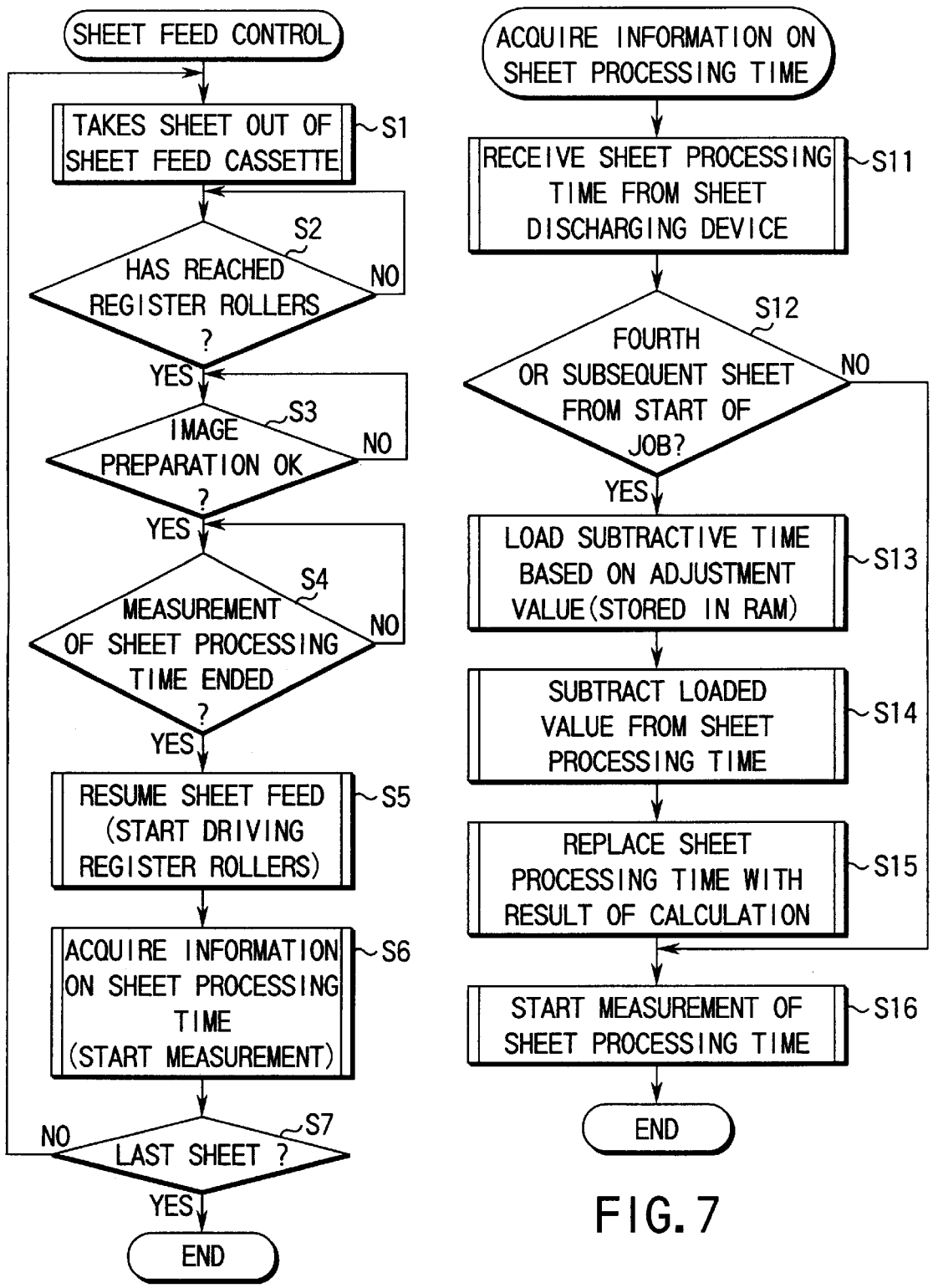
FIG. 6 is a flowchart illustrating how sheet feed control is performed.
FIG. 7 is a flowchart illustrating how information on a sheet processing time are acquired.

FIG. 7 is a flowchart illustrating the processing that is executed for acquiring a sheet processing time when a printing operation is executed for a plurality of sheets. In the description below, reference will be made to the case where the printing operation for the first three pages of the print job is executed without the sheet processing time being shortened.

First of all, the printer CPU 141 issues a signal requesting that the finisher CPU 171 acquire information regarding the sheet processing time, and supplies that signal to the finisher 171. Upon receipt of the signal, the finisher CPU 171 determines a sheet processing time in accordance with the processing mode, and informs the printer CPU 141 of the determined sheet processing time. Upon receipt of the information on the sheet processing time from the finisher CPU 171 (Step S11), the printer CPU 141 determines how many sheets have been subjected to the printing operation after the start of the presently-executed print job (Step S12). If the determination shows that the presently-printed sheet is the first, second or third sheet ("NO" in Step S12), the sheet processing time indicated by the received information is used as it is, and the measurement of that sheet processing time is started (Step S16).

If the determination shows that the presently-printed sheet is one of the fourth and subsequent sheets ("YES" in Step S12), the adjustment value, namely, the time to be subtracted from the sheet processing time, is loaded from the storage area 144a of the NVM 144 (Step S13). Then, the printer CPU 141 subtracts the loaded time from the sheet processing time received from the finisher CPU 171 (Step S14). The printer CPU 141 replaces the presently-active sheet processing time with the result of the calculation, namely, the new sheet processing time obtained by subtracting the loaded time from the original sheet processing time (Step S15). Thereafter, the printer CPU 141 starts measurement of the new processing time (Step S16).

In the case where the adjustment value in the storage area 144a of the NVM 144 is a ratio that defines a length of time to be subtracted from the sheet processing time, the sheet processing time is calculated in the above-mentioned step S14 in accordance with the ratio defining the length of time to be subtracted.

The processing defined in steps S11 to S16 described above is executed in Step S6 shown in FIG. 6. The processing shown in FIG. 6 is repeated until there is no more job to do or no more sheet to be printed.

As described above, the main body 2 of the digital copying machine 2 subtracts a certain length of time from the sheet processing time designated by the finisher.

Owing to this feature, the main body 2 of the digital copying machine can execute printing processing with no need to lower the original processing speed of the main body, even if the finisher is coupled to the main body 2.

When the finisher executes the functions of the stapling, sorting and grouping modes, the operation of the finisher may decrease the processing speed of the main body 2 of the digital copying machine, but this decrease can be suppressed to be a minimum.

The same finisher can be applied to different types of digital copying machines, one capable of high-speed printing and another capable of low-speed printing. The use of the same finisher enables each type of digital copying machine to attain its optimal processing speed. In other words, even if the finisher is the type adapted for the digital copying machine capable of low printing speed, the use of it permits the high-speed digital copying machine to perform a printing operation without the processing speed being lowered.

The sheet processing time is not shortened after the stapling operation executed in the stapling mode or the shifting operation executed in the sorting-grouping mode. The sheet processing time is shortened after a predetermined number of pages have been printed. In other words, the sheet processing time is not shortened until a predetermined number of pages from the first one are printed.

Owing to the features described above, paper jamming or other undesirable situations do not occur in a finisher at the start of each print job, even if the mechanical operation of that finisher somewhat deviates from the intended at the time of design.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus which is of a type comprising image forming means for forming an image on an image formation medium, and discharge means for discharging the image formation medium on which the image is formed by the image forming means, said image forming apparatus further comprising:
    adjustment means for adjusting a processing time designated by the discharge means and indicating a time interval that is left before image formation processing is executed next; and
    control means for controlling the image forming means to execute the image formation processing, based on the processing time adjusted by the adjusting means.

2. An image forming apparatus according to claim 1, wherein said adjusting means makes adjustment by shortening the processing time designated by the discharge means.

3. An image forming apparatus according to claim 1, further comprising a memory for storing an adjustment value used for making adjustment of the processing time designated by the discharge means, said adjusting means reading an adjustment value read out from the memory and making adjustment of the processing time designated by the discharge means.

4. An image forming apparatus according to claim 1, further comprising determination means for determining whether or not the adjustment means should adjust the processing time, in accordance with image formation processing to be executed, wherein
    if the determination means determines that the processing time should not be adjusted, the control means is operated based on the processing time designated by the discharge means, without permitting the adjustment means to make adjustment, and
    if the determination means determines that the processing time should be adjusted, the control means is operated based on the processing time adjusted by the adjustment means.

5. An image forming apparatus according to claim 1, wherein said image forming means executes the image formation processing based on print jobs, said control means is operated based on the processing time designated by the discharge means, without the adjustment means making adjustment, when the image forming processing is executed with respect to a predetermined number of pages from a start of one print job, and said control means is operated based on the processing time adjusted by the adjustment means, after the image forming processing is executed with respect to said predetermined number of pages from the start of one print job.

6. An image forming apparatus according to claim 3, wherein the adjustment value stored in the memory is entered in an operating mode that can be used by an authorized user alone.

7. An image forming method for use in an image forming apparatus that comprises image forming means for forming an image on an image formation medium, and discharge means for discharging the image formation medium on which the image is formed by the image forming means, said image forming method comprising the steps of:
    adjusting a processing time designated by the discharge means and indicating a time interval that is left before image formation processing is executed next; and
    controlling the image forming means to execute the image formation processing on the basis of the adjusted processing time.

8. An image forming method according to claim 7, wherein adjustment of the processing time is made by shortening the processing time designated by the discharge means.

9. An image forming method according to claim 7, further comprising the steps of: causing a memory to store an adjustment value used for making adjustment of the processing time designated by the discharge means; reading an adjustment value from the memory and making adjustment of the processing time designated by the discharge means.

10. An image forming method according to claim 7, further comprising the step of determining whether adjustment of the processing time is necessary or unnecessary, in accordance with image formation processing to be executed, wherein
    if the adjustment of the processing time is determined as being unnecessary, image forming processing is executed based on the processing time designated by the discharge means, without making the adjustment of the processing time, and if the adjustment of the processing time is determined as being necessary, the image forming processing is executed based on the adjusted processing time.

11. An image forming method according to claim 7, wherein the image forming means executes the image formation processing based on print jobs, the image forming processing is executed based on the processing time designated by the discharge means, without making adjustment of the processing time with respect to a predetermined number of pages from a start of one print job, and the image forming processing is executed based on the adjusted processing time with respect to pages that are subsequent to said predetermined number of pages from the start of one print job.

12. An image forming method according to claim 9, wherein the adjustment value stored in the memory is entered in an operating mode that can be used by an authorized user alone.

* * * * *